Oct. 7, 1947.   L. W. HARDELL   2,428,706
PREFLIGHT TRAINING PLANE
Filed July 5, 1944   4 Sheets-Sheet 1
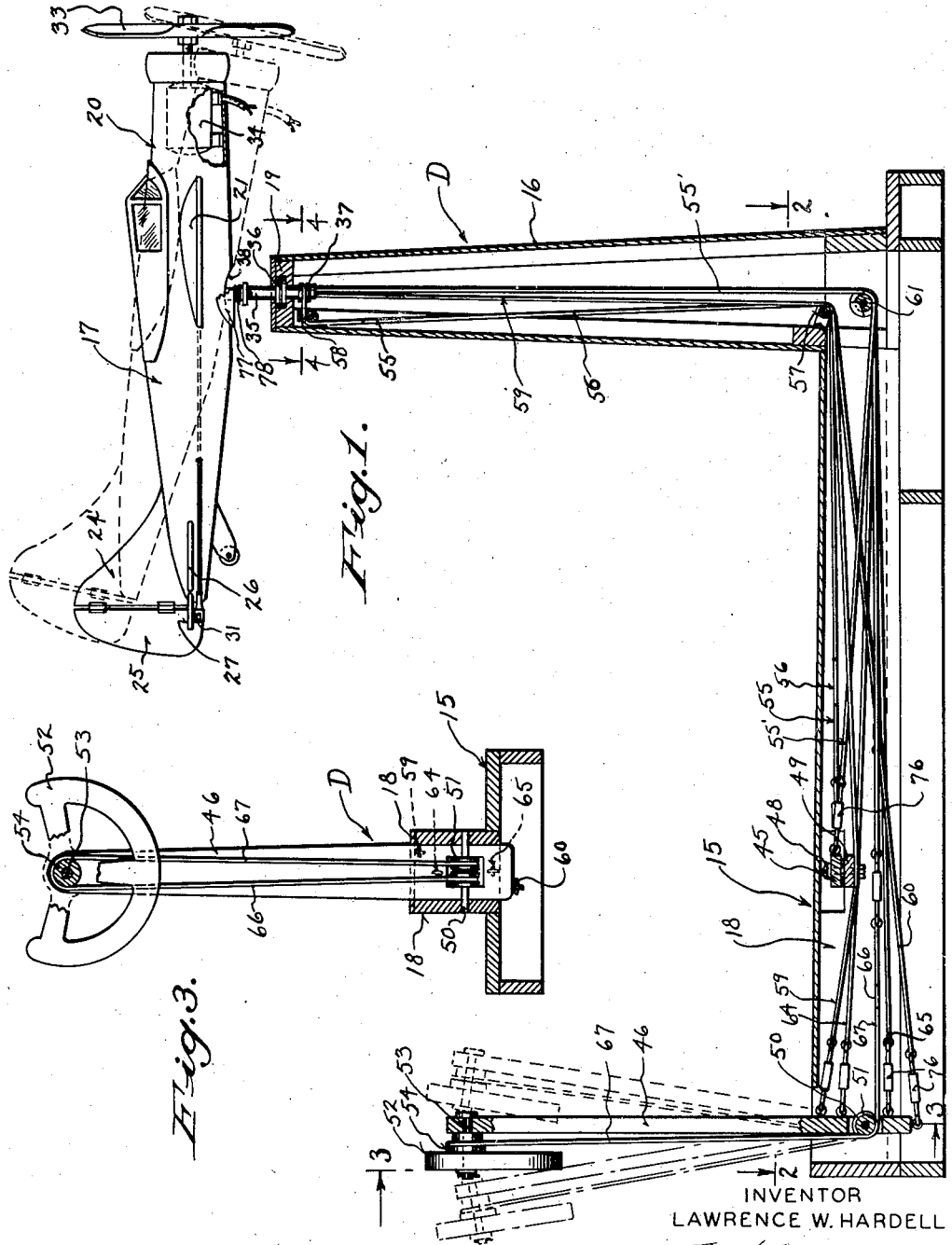
INVENTOR
LAWRENCE W. HARDELL
BY
ATTORNEYS Oct. 7, 1947.  L. W. HARDELL  2,428,706
PREFLIGHT TRAINING PLANE
Filed July 5, 1944  4 Sheets-Sheet 2
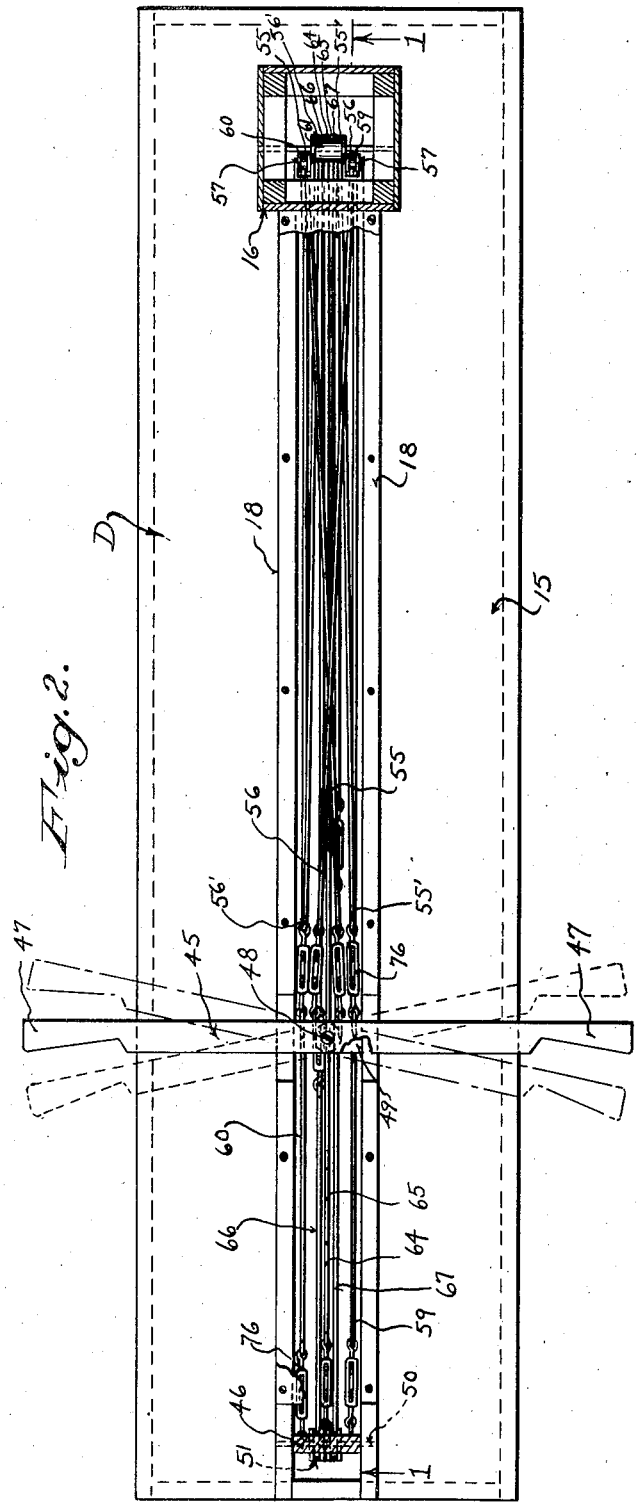
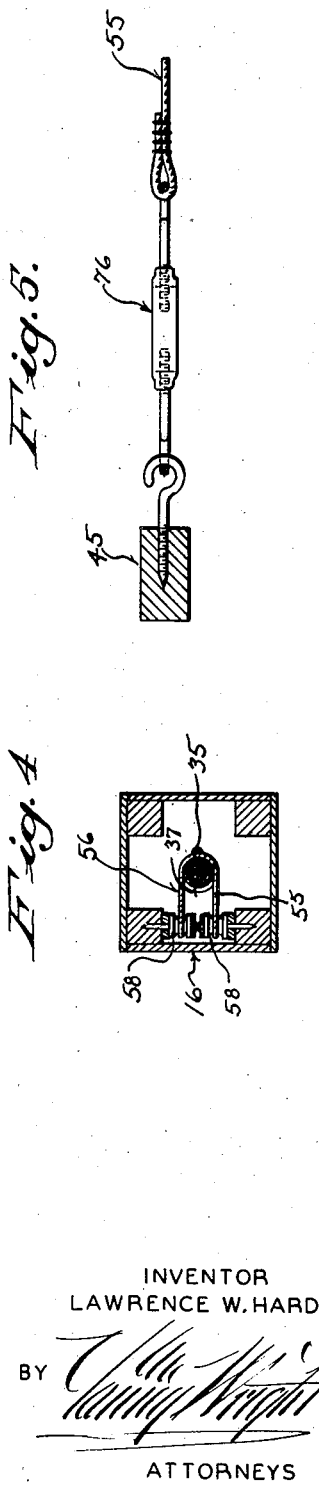
INVENTOR
LAWRENCE W. HARDELL
BY
ATTORNEYS

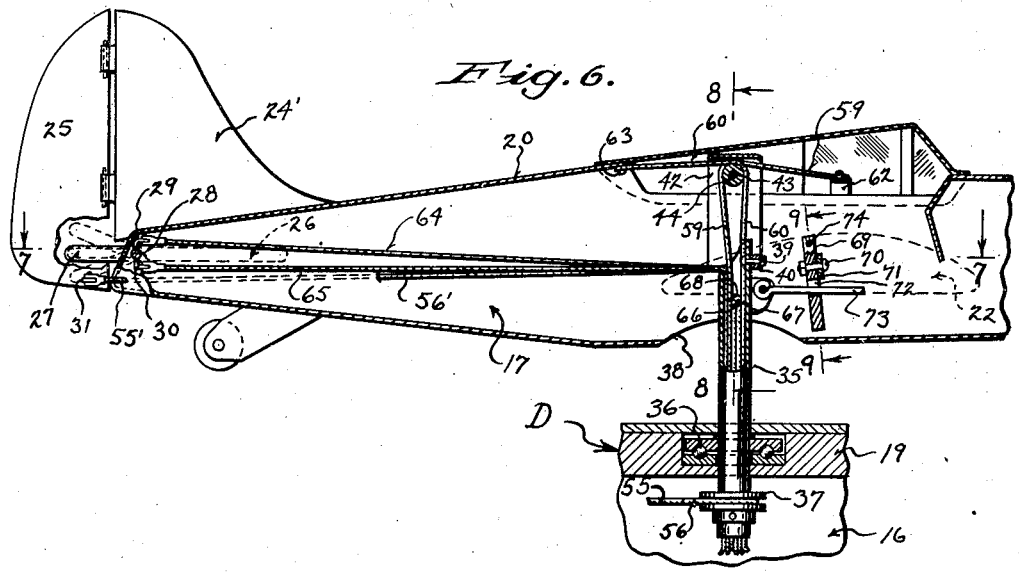
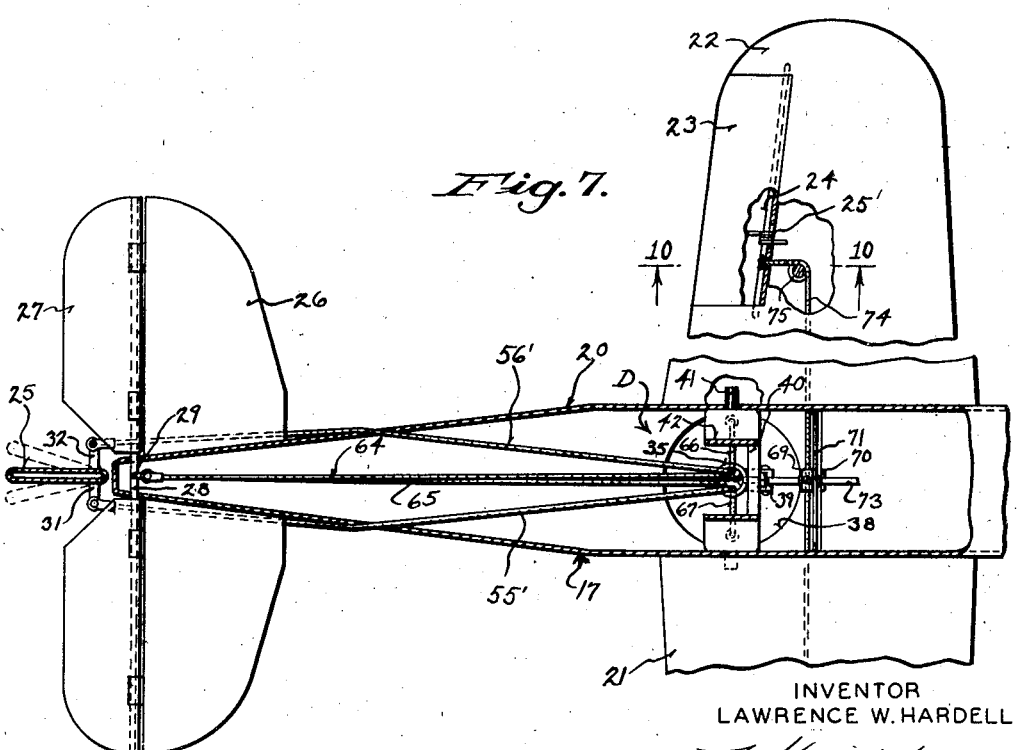

Oct. 7, 1947.  L. W. HARDELL  2,428,706
PREFLIGHT TRAINING PLANE
Filed July 5, 1944  4 Sheets-Sheet 4

INVENTOR
LAWRENCE W. HARDELL

BY

ATTORNEYS

Patented Oct. 7, 1947

2,428,706

UNITED STATES PATENT OFFICE 2,428,706

PREFLIGHT TRAINING PLANE

Lawrence Walter Hardell, Wausau, Wis., assignor of ten per cent to Fred W. Genrich, Jr., and twenty-eight and one-third per cent to Edward John Randant, Jr., both of Wausau, Wis.

Application July 5, 1944, Serial No. 543,562

1 Claim. (Cl. 35—12)

This invention appertains to aeronautics and more particularly to a novel device for facilitating the preliminary training of persons in the handling and the manipulation of airplanes.

One of the primary objects of my invention is to provide a training device for pilots of airplanes embodying a miniature airplane built preferably to scale and carried by a support in full view of the trainee for rocking and turning movement in all directions with a substantially full-sized regulation manual control for the plane and spaced therefrom, whereby upon manipulation of said manual control, the airplane can be caused to tilt and swing in various directions, so that the action of a plane in flight upon manipulation of its controls can be accurately observed and studied by the trainee.

Another salient object of my invention is to provide means connected with the airplane and its various control devices; i. e. rudder, elevators, ailerons, etc. for operating the plane and its control devices, so that as the plane turns, swings and banks, the movement of the controls can be clearly observed.

A further important object of my invention is to provide a small sized airplane, which can either be used as a training device for pilots or as an amusement device for children and other persons, having manual controls spaced from the airplane for manipulating the airplane and its control parts.

A still further object of my invention is to provide a novel device of the above character which will be durable and efficient in use, one that will be simple to manufacture and one which can be placed upon the market at a reasonable cost.

With these and other objects in view, the invention consists in the novel construction, arrangement and formation of parts as will be hereinafter more specifically described, claimed, and illustrated in the accompanying drawings, in which drawings:

Figure 1 is a vertical, longitudinal, sectional view through my novel device, the view being taken substantially on the line 1—1 of Figure 2 looking in the direction of the arrows.

Figure 2 is a horizontal sectional view through the base of my device taken on the line 2—2 of Figure 1 looking in the direction of the arrows.

Figure 3 is a transverse sectional view taken through the base on the line 3—3 of Figure 1 looking in the direction of the arrows and illustrating the control stick.

Figure 4 is a horizontal sectional view through the supporting standard carried by the base, the view being taken on the line 4—4 of Figure 1 looking in the direction of the arrows and illustrating the controls for turning the plane to the right or left.

Figure 5 is an enlarged fragmentary detail sectional view illustrating means for detachably connecting either of the control cables with either the rudder bar or the stick.

Figure 6 is an enlarged longitudinal sectional view through the plane illustrating the arrangement of certain control cables, and particularly the cables for turning the plane and the rudder right or left, for tilting the plane and its elevator up or down and the mechanism for actuating the ailerons.

Figure 7 is a horizontal sectional view through the airplane taken substantially on the line 7—7 of Figure 6 looking in the direction of the arrows.

Figure 8:
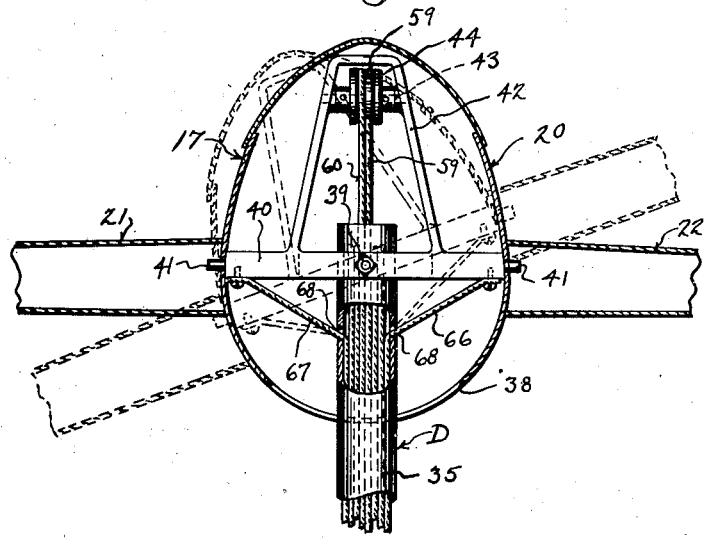
Figure 8 is a fragmentary transverse sectional view through the airplane taken on the line 8—8 of Figure 6 looking in the direction of the arrows.

Referring to the drawings in detail wherein similar reference characters designate corresponding parts throughout the several views the "D" generally indicates my novel training or amusement device and the same includes a base 15, for support at one end an upright column or standard 16. The standard in turn carries the miniature airplane 17, which is preferably modeled to scale and built to simulate a particular type and model of plane.

The base 15 with its column 16 can be built in various ways and for the purpose of illustration I have shown the base 15 to be of an elongated box-like form and the same includes spaced side walls 18. The upright column or standard 16 is firmly secured to the base and is also of a hollow form and carries at its extreme upper end a fixed turn table support 19, for a purpose which will be later described. The base and its column houses the various control cables for the plane, as will later be specifically described.

Now referring to the plane 17 itself, the same includes the fuselage 20 having extending from the opposite sides thereof the wings 21 and 22. Carried by the wings 21 and 22 are the ailerons 23. These ailerons are mounted for swinging movement on hinge pins 24. A spring 25' is provided for each aileron and the springs function to normally hold the ailerons in a downward tilted position, for a purpose which will later appear.

The fuselage 20 carries at its tail the usual empennage assembly and hence the tail is provided with the vertical stabilizer 24' to which is hingedly connected the rudder 25. Hingedly connected for swinging movement to the horizontal stabilizer 26 is the elevator 27. The elevator 27 is secured to a hinge rod 28 which is rotatably mounted in suitable hinge barrels carried by the horizontal stabilizer. The hinge pin 28 has secured thereto an upwardly extending crank 29 and a depending crank 30. It might also be noted at this point that the rudder 25 is likewise provided with the oppositely extending crank arms 31 and 32.

The plane can be provided with any preferred type of landing gear solely for the purpose of enhancing the appearance thereof. For this purpose, too, the front of the fuselage carries the propeller 33, and a small electric motor 34 is carried by the fuselage for rapidly turning the propeller. The rapid rotation of the propeller gives a life-like appearance to the plane and also creates a desired sound which will simulate a plane.

The connection of the airplane 17 with the supporting column or post 16 forms an important part of my invention and it is to be noted that the column rotatably carries an upright post 35 which extends into the fuselage. This post 35 is rotatably mounted in the turn table block 19 of the column through suitable anti-friction bearings 36. Fixed to the post 35 below the turn table block is a pulley wheel 37 for turning the post through means which will be later described. The post extends into the fuselage through an enlarged opening 38 and the upper end of the post has pivotally connected thereto, by a pivot pin 39, a transversely extending cross head 40. The ends of the cross head 40 terminate in pintles 41 which are received in bearing openings formed in the opposite sides of the fuselage 20.

From the description so far it can be seen that upon the turning of the post the airplane can be swung to the right or to the left and that by swinging the cross head 40 on its pivot 39 the plane itself can tilt to the right or left around a longitudinal axis. Also the plane itself can tilt up and down on the pintles 41.

The cross head 40 carries an upstanding bracket 42 which terminates above the post 35 and this bracket rotatably carries a shaft 43 to which is keyed an idle pulley 44, the purpose of which will also later appear.

The base 15 at a point remote from the column 16 carries a rudder bar 45 and the control stick 46. The rudder bar extends from the opposite sides of the base and terminates in pedals or foot pieces 47. A pivot pin 48 rockably supports the rudder bar and this pivot pin can be carried by a cross brace 49 which forms a part of the base.

The control stick 46 is rockably mounted upon a horizontal pivot 50 carried by the base and consequently the stick can be moved back and forth and by referring to Figure 3, it can be seen that the stick extends above and below the pivot 50. The pivot 50 also carries idle pulley wheels 51, the purpose of which will later appear. The control stick 46 at its upper end carries the control wheel 52 and this wheel is mounted for turning movement upon a pivot bolt 53 carried by the stick. The control wheel 52 has formed thereon or secured thereto a pulley wheel 54.

The rudder bar 45 and the stick 46 are substantially full size and the person manipulating the plane sits in a suitable seat, not shown, in front of the stick for operating the stick and the rudder bar, and obviously the airplane 17 will be in direct view of this person.

The rudder bar 45 controls the swinging of the airplane to the right or left about a vertical axis and the turning of the rudder 25, and this is brought about through the use of certain control cables that will now be described. Secured to the rudder bar 45 on opposite sides of the pivot 48 are cables 55 and 56 and these cables control the swing of the plane. The cables are brought forwardly from the rudder bar to the hollow column or standard 16 and are trained about idle pulleys 57 carried by the column and these cables cross before reaching the column. The cables 55 and 56 are brought up through the column and are trained over idle pulleys 58 carried by the column and disposed adjacent to the pulley wheel 37 secured to the swinging post 35 and these cables are secured together about the pulley wheel so as to form in effect a single cable. Obviously by working the rudder bar back and forth the post can be rotated and the plane turned. Also secured to the rudder bar 45 on opposite sides of the pivot pin 48 and beyond the cables 55 and 56 are pull cables 55' and 56' and these cables are brought forwardly to the hollow column 16 and are trained over an idle pulley spool 61 carried by the column. These cables extend up through the column and through the rotatable post 35, which is in the nature of a sleeve or a short length of tubing and are then brought back through the fuselage and are connected with the rudder cranks 31 and 32. Consequently, upon the turning of the rudder bar 45 not only is the plane being turned, but the rudder will be turned therewith and the cables are so related that as the plane turns to the right the rudder will be turned to the right to simulate the actual turning of a plane. As heretofore intimated the control stick 46 operates the swinging or tilting of the plane up and down and the swinging of the elevator 27 in proper relation to the tilting of the plane. This is brought about through the use of suitable cable connections between the stick 46 and the plane and the elevator and this cable connection will now be described. Secured to the stick on opposite sides of the horizontal pivot are cables 59 and 60. These cables extend forwardly through the base toward the column and are trained over the idle pulleys 57. The cables then extend through the column 16, through the hollow post 35 and into the fuselage and over the pulley 44. The cable 59 is secured to a cross brace 62 forming a part of the fuselage, and this cable is located forwardly of the pintles 41. The cable 60 extends rearwardly and is attached to the fuselage as at 63 in back of the pintles. Consequently, when the stick 46 is swung back, a pull is exerted on the cable 59 which results in the upward tilting of the plane. When the stick is pushed forwardly, a pull will be exerted on the cable 60 and the plane will be tilted town. Cables 64 and 65 are also secured to the stick on opposite sides of the pivot 50, and these cables extend forwardly toward the column 16 and are trained over the pulley spool 61. The cables 64 and 65 extend up through the columns and through the hollow post 35 and back into the fuselage toward the elevator and the cables are connected to the arms 29 and 30 secured to the pivot rod 28 carrying the elevator 27. The cable 64 is connected to the arm 29 while the cable 65 is connected to the arm 30. If the person desires to tilt the nose of the plane up, the stick 46 is pulled rearwardly, and consequently a pull will be exerted on the cables 59 and 64 and the plane will be tilted and the elevator swung up. When the stick is positioned forwardly, the nose of the plane will tilt down and the elevator will be pulled down by the cable 65, the cables are preferably waxed so as to facilitate travel past one another and to prevent undue wear thereon.

To bank or roll the plane, suitable cables are connected with the wheel 52 and to the cross head 40, and these cables are indicated by the reference characters 66 and 67 and the cables are trained about the pulley 54 so that upon the turning of the wheel 52 and the pulley, the cables will be actuated in the desired direction. The cables 66 and 67 extend down the stick 46 and are trained over the guide pulley 51 and are then brought forwardly through the base and into the column 16 over the pulley spool 61. These cables are then threaded through the post 35 and are brought out from the post through guide openings 68 formed in the post. The ends of the cables are secured to the cross head 40 on opposite sides of the pivot 39. When the wheel 52 is turned to the left, see Figure 3, a pull is exerted on cable 67 and the cross head 40 will rock on its pivot 39 and the plane will tilt to the right. When the wheel is turned to the right, a pull will be exerted on cable 66 and the plane will tilt to the left.

As the plane tilts, the ailerons 23 are automatically actuated to the correct positions by means of a swinging lever 69. This lever is rockably carried by a pivot pin 70 which is supported on a cross strut 71 forming a part of the fuselage. The lever 69 below the pivot 70 is provided with a slot 72 into which extends a forwardly extending operating rod 73. This operating rod is carried by the hollow post 35. Secured to the lever 69 above its pivot is a control wire or cable 74 and the ends of this cable are secured respectfully to the opposite ailerons 23 above their pivot pins 24. Suitable idle pulley wheels 75 can be carried by the wings for the cable 74.

Figure 9:
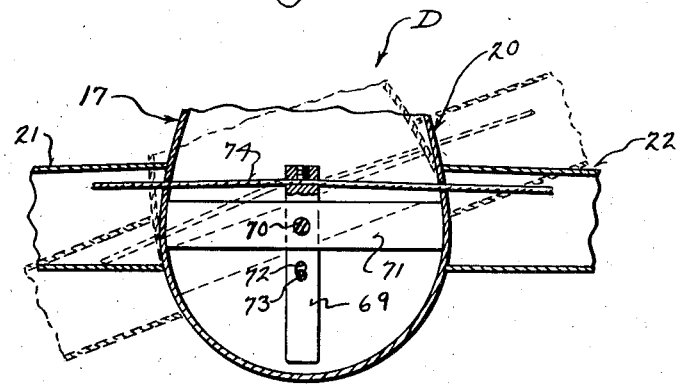
Figure 9 is a fragmentary transverse sectional view through the airplane taken on the line 9—9 of Figure 6 and illustrating in detail the automatic control for the ailerons.
Figure 10:
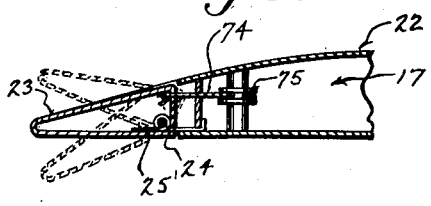
Figure 10 is a fragmentary detail transverse sectional view through one wing of the airplane, the view being taken substantially on the line 10—10 of Figure 7 looking in the direction of the arrows, the view showing an aileron control.

Normally the ailerons 23 tend to move in a lowered position under the influence of their springs 25'. However, when the lever 69 is in a central position both runs of the cable 74 are taut and the ailerons are pulled up flush with the wings against the tension of the springs. Now as the plane tilts the lever 69 will be held stationary by the rod 73, see Figure 9, and consequently one length of the cable will be slackened (as one side of the fuselage of the plane approaches the upper end of lever 69) and the other length of the cable will be pulled (as the opposite side of the fuselage rides away from the upper end of the lever 69). This will allow one aileron to be pulled up and the other aileron to lower by its spring. The opposite action takes place when the plane is tilted in the opposite direction and in actual practice as the plane tilts to the right, the aileron carried by the lowered right wing will tilt up and aileron carried by the left wing will be tilted down.

From the foregoing description it can be seen that the plane 17 can be effectively put through all of the maneuvers of an actual airplane, by the use of the rudder bar 45 and the stick 46 with its wheel 52. Hence, a person can put the plane 17 through various maneuvers and watch the action thereof.

The cables can all have turn buckles 76 connected therewith so that undesirable slack can be taken up. It is also preferred to connect the cables by means of hooks and eyes with the rudder bar 45 and the stick 46 so that certain cables can be disconnected when desired. For instance, if it is desired to test the action of the plane in a wind tunnel, the cables 55 and 56 can be disconnected as can the cables 59 and 60.

As shown in Figure 1 only, I can provide a cup-shaped plate 77 for closing the opening 38 in the bottom of the airplane 17, which might be desirable under certain conditions. The plate is free to rock in all directions on the post 35 and is held against the bottom of the plane by a spring 78.

Changes in details may be made without disturbing from the spirit or the scope of my invention, but what I claim as new is:

In an aeronautical device, a base, a column on said base, an upright post rotatably carried by the column, a cross-head rockably mounted at its center on the post for turning movement therewith and for swinging movement thereon, horizontally disposed pintles on the opposite ends of the cross-head, a miniature airplane, including a fuselage receiving the upper end of the post, having transversely aligned bearing openings therein, said bearing openings rotatably receiving the pintles of the cross-head, whereby the airplane can rock up and down on the cross-head, said airplane having movable ailerons, elevators and a rudder, a rudder bar pivoted at its center to the base and spaced from the column, cables operatively connecting the rudder bar to the post for turning the post upon movement of the rudder bar, a control stick rockably mounted on the base adjacent to the rudder bar, a control wheel rotatably mounted on the control stick, cables operatively connecting the control stick with the airplane for tilting the same on the cross-head, cables operatively connecting the control stick with the elevator for moving the same, a cable operatively connecting the control wheel with the cross-head for tilting the cross-head on the post, a lever pivoted to the fuselage of the airplane, a control cable secured intermediate its ends to the lever above the pivot, and having its opposite ends operatively connected to the ailerons, and a connection between the post and lever below its pivot for holding said lever against swinging when the airplane is tilted with the cross-head on the post.

LAWRENCE WALTER HARDELL.

REFERENCES CITED

The following references are of record in the file of this patent:

UNITED STATES PATENTS

| Number | Name | Date |
|---|---|---|
| 1,825,462 | Link | Sept. 29, 1931 |
| 1,876,418 | Holst | Sept. 6, 1932 |
| 1,912,721 | Pardue | June 6, 1933 |
| 1,928,519 | Weisinger | Sept. 26, 1933 |
| 1,937,241 | Pardue | Nov. 28, 1933 |
| 1,939,047 | Gerhardt | Dec. 12, 1933 |
| 2,263,359 | Howe | Nov. 18, 1941 |
| 2,336,711 | Barber | Dec. 14, 1943 |
| 2,061,953 | Sampson | Nov. 24, 1936 |